United States Patent [19]

Waldeck

[11] 3,908,091

[45] Sept. 23, 1975

[54] DIAL PULSE CORRECTION CIRCUIT FOR TELEPHONE SIGNALING SYSTEM

[75] Inventor: Gary C. Waldeck, Scottsdale, Ariz.

[73] Assignee: GTE Automatic Electric Laboratories Incorporated, Northlake, Ill.

[22] Filed: Feb. 13, 1974

[21] Appl. No.: 442,028

[52] U.S. Cl. .......... 179/16 EA

[51] Int. Cl.$^2$ .......... H04Q 1/36

[58] Field of Search .......... 179/16 E, 16 EA, 16 EC; 178/70 R, 70 TS; 328/164

[56] References Cited

UNITED STATES PATENTS

| | | | |
|---|---|---|---|
| 3,452,220 | 6/1969 | Fritschi | 179/16 E |
| 3,659,055 | 4/1972 | Witmore | 179/16 E |
| 3,671,875 | 6/1972 | Pento | 179/16 E |
| 3,794,775 | 2/1974 | Hicks et al. | 179/16 EA |

*Primary Examiner*—Kathleen H. Claffy
*Assistant Examiner*—Randall P. Myers
*Attorney, Agent, or Firm*—Russell A. Cannon; Leonard R. Cool

[57] ABSTRACT

An inverted dial pulse signal and the output of a D flip-flop sample-hold circuit are EXCLUSIVE-OR'd to control the operation of a first one-shot multivibrator-timer circuit that operates in a triggered state for a first prescribed time interval. The output of the first multivibrator controls the operation of the sample-hold circuit for sampling the inverted signal. The output of the sample-hold circuit is applied to a second one-shot multivibrator-timer circuit that operates in the triggered state for a second prescribed time interval for positive going pulses. The output of the sample-hold circuit is also NOR'd with the output of the second multivibrator to produce a corrected dial pulse signal. The duration of the break pulse interval in the corrected signal is equal to the second time interval if the duration of the break pulse interval in the input signal is greater than the first time interval and less than the second time interval. The duration of the break pulse interval in the corrected signal is equal to the duration of the break pulse interval in the input signal if the latter is greater than the second time interval.

9 Claims, 3 Drawing Figures

DIAL PULSE CORRECTION CIRCUIT FOR TELEPHONE SIGNALING SYSTEM

BACKGROUND OF THE INVENTION

This invention relates to telephone systems, and more particularly to an improved dial pulse correction circuit in a telephone signaling system.

In many telephone switching systems, control signals are transmitted in the form of DC pulses. Supervisory signals such as for indicating on-hook and off-hook conditions of a subscriber handset, for example, are DC pulses having durations that are typically greater than 100 milliseconds long. A dial pulse produced by the handset of a calling subscriber, however, comprises a series of break pulse intervals and make pulse intervals. These break and make pulse intervals correspond to the time periods that the dial contacts of the calling subscriber handset are open and closed, respectively, during dialing that is initiated thereby. Dial pulses are transmitted from the calling subscriber handset to central office equipment where they may be subsequently transmitted to other central offices. A subscriber handset is typically designed to produce dial pulses having a nominal pulse repetition frequency (PRF) of 10 pulses per second (pps) with break and make pulse intervals of 60 milliseconds and 40 milliseconds, respectively. It is necessary to maintain minimum durations of the break and make pulse intervals and to maintain the break pulse interval much longer than the make pulse interval in order to ensure proper operation of central office switching equipment. This requirement may occur either at the transmitting or the receiving end of a central office signaling system. Although dial pulses may initially have relatively uniform characteristics, with desirable durations and ratios of break and make pulse intervals, they may be subsequently distorted or modified in time duration by their passage through circuitry and channels for transmitting these pulses to remote switching equipment and through the inductive and capacitive impedances of the subscriber loop circuit. It may be necessary to use pulse correction circuitry at both terminal ends of and at intermediate points in a signaling system in order to ensure that the minimum pulse intervals are maintained. Also, separate correction circuitry may be employed at various points in the signaling system for correcting the shapes and durations of either or both of the break pulse and make pulse intervals. Many prior-art dial pulse correction circuits employ analog circuits and techniques which are relatively complex and costly, and are susceptible to error. It has been determined that in the signaling system of a multichannel subscriber carrier telephone system operating between central offices, on a common signaling channel, it is desirable to recognize dial pulses having PRF's between 7.5 and 12.5 pulses per second and to produce corrected dial pulses with break pulse intervals that are at least 59 milliseconds long, for example, in response to received dial pulse signals with break pulses having durations that are greater than 22% of a dial pulse period prior to transmission thereof between central offices.

An object of this invention is the provision of an improved dial pulse correction circuit that employs digital techniques and circuitry.

DESCRIPTION OF PREFERRED EMBODIMENT

Figure 1:
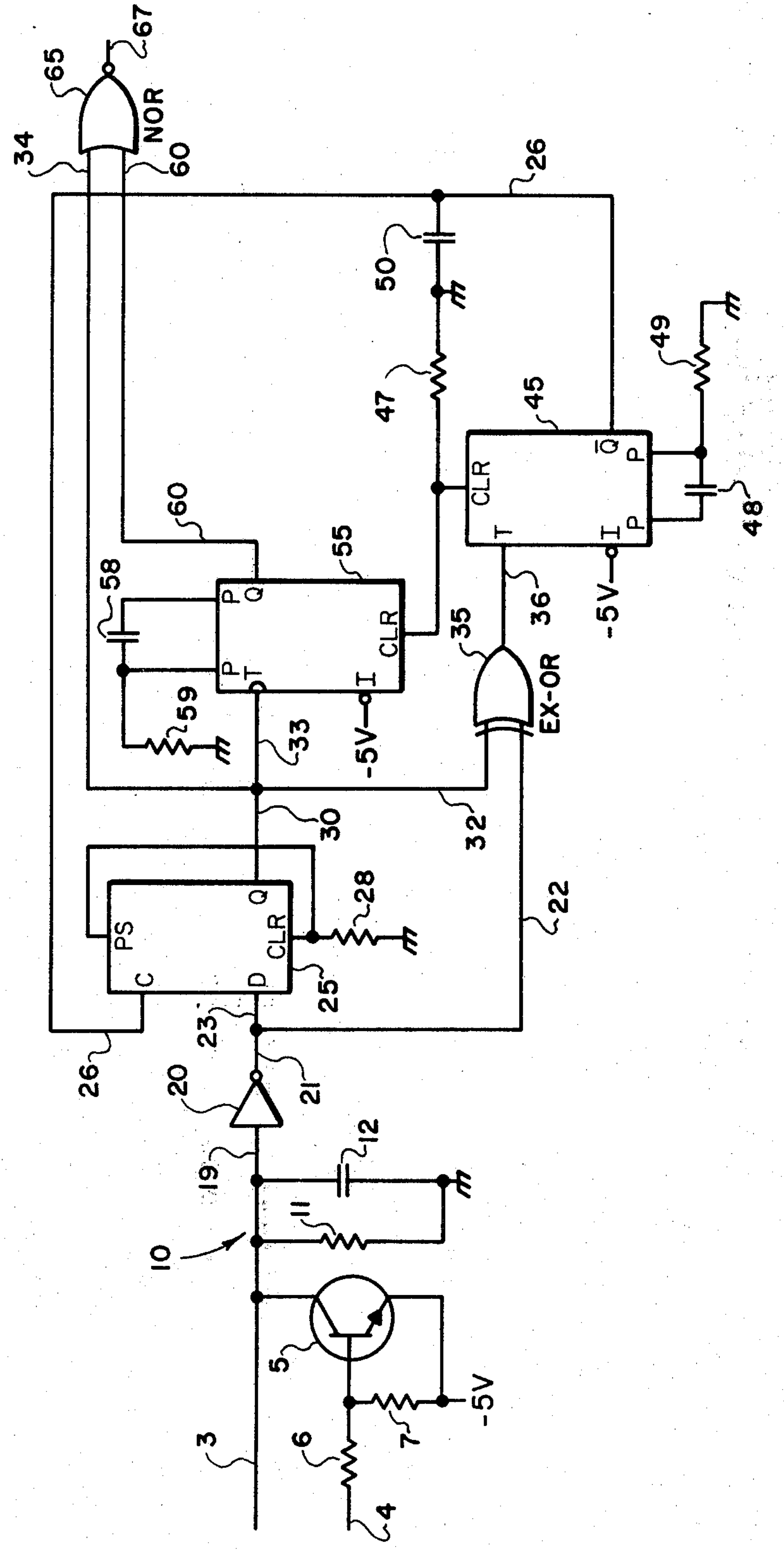
FIG. 1 is a schematic circuit diagram of a dial pulse correction circuit embodying this invention.

The preferred embodiment of this invention in FIG. 1 utilizes a number of integrated circuit packages with positive logic wherein a positive going pulse is a logic level 1. The pulse-correction circuit in FIG. 1 comprises an inverter 20, D flip-flop circuit 25, EXCLUSIVE-OR gate 35, one-shot multivibrators 45 and 55, and NOR-gate 65. Non-corrected dial pulse signals with negative and positive going break pulses are applied to lines 3 and 4, respectively, although not at the same time. A transistor 5 and bias resistors 6 and 7 are connected between input lines 3 and 4 and a −5 volt supply potential. The transistor 5 is operative for inverting a dial pulse signal on line 4 with positive going break pulses to produce a corresponding dial pulse signal on the other input line 3 with negative going break pulses. Normally, only one or the other of the lines 3 and 4 is connected to external equipment. The remaining input line is left open. Depending upon which input line is left open, resistors 6 and 7 or 11 effectively terminate the associated transistor 5 or inverter 20.

The dial pulse signals on line 3 are applied to the input terminal 19 of inverter 20. A filter circuit 10 comprising resistor 11 and capacitor 12 is connected between line 19 and ground to bypass high frequency signal components associated with transitions in received dial pulse signals. The inverter 20 may, by way of example, be a model 7404 integrated circuit (IC) package which is manufactured by Texas Instruments Incorporated (TI).

The output of inverter 20 is applied on line 22 to one input of the EXCLUSIVE-OR circuit 35 and on line 23 to the input-data terminal D of flip-flop 25 which may, by way of example, be a TI 7474 IC package. The clock terminal C of the flip-flop 25 is connected through line 26 to the $\overline{Q}$ output terminal of the one-shot multivibrator 45. The clear (CLR) and preset (PS) terminals of the flip-flop 25 are connected through a pull-up resistor 28 to ground in order to connect a logic level 1 thereto. This causes the operation of circuit 25 to be under the control of the signals applied to the C and D terminals thereof. The output of flip-flop 25 is coupled from the Q terminal thereof. The operation of the flip-flop 25 is such that regardless of the current logic level of the Q output thereof, this Q output will assume and hold the logic level of the current D input signal upon receipt of a positive going pulse at its clock terminal C.

The Q output of flip-flop 25 is coupled on line 32 to the other input terminal of the EXCLUSIVE-OR circuit 35; on line 33 to the true input terminal T of one-shot multivibrator 55; and on line 34 to one input of NOR-gate 65. The EXCLUSIVE-OR gate 35 may, by way of example, be a TI 7486 IC package. Circuit 35 produces an output signal on line 36 only when an input signal on either one, but not both, of the input lines 22 and 32 is high.

The output of gate 35 is applied on line 36 to the true input terminal T of multivibrator 45 which may, by way of example, be a TI 74123 IC package. The clear terminal CLR of circuit 45 is connected through resistor 47 to ground, and the inverted terminal I thereof is connected to the −5 volt supply potential in order to connect logic levels 1 and 0, respectively, thereto. This causes the operation of this multivibrator 45 to be controlled only by the signal on line 36. A capacitor 48 is connected between the time period determining terminals P of circuit 45 with one of these terminals P being connected through resistor 49 to ground. The on-time $T_{45}$ of circuit 45 in the triggered state is representable as $$T_{45} = 0.28\ RC\left(1 + \frac{0.7}{R}\right), \quad (1)$$

where $T_{45}$ is in nanoseconds; $R$ is the resistance of resistor 49 in kohms; and $C$ is the capacitance of capacitor 48 in picofarads. In a correction circuit embodying this invention that was built and tested, the $RC$ time constant on resistor 49 and capacitor 48 was selected to be 17 milliseconds. The $\overline{Q}$ output terminal of circuit 45 is connected to ground through capacitor 50 which bypasses high frequency transient components in output pulse signals on line 26. The $\overline{Q}$ output signal from multivibrator 45 on line 26 is the clock signal for controlling the operation of the D flip-flop 25. The one-shot multivibrator 45 produces a negative going pulse signal on line 26 for a 17 millisecond time interval only in response to a positive going transition on line 36.

Similarly, the clear terminal CLR of circuit 55 is connected through resistor 47 to ground, and the inverted terminal I thereof is connected to the −5 volt supply potential in order to connect logic levels 1 and 0, respectively, to these terminals. This causes the operation of the one-shot multivibrator circuit 55 to be controlled only by the Q output of the D flip-flop 25 which is applied on line 33 to the true input terminal T of the former. A capacitor 58 is connected between the time period determining terminals P of circuit 55 with one of these terminals P being connected through resistor 59 to ground. The on time $T_{55}$ of circuit 55 in the triggered state is representable as $$T_{55} = 0.32\ R'C'\left(1 + \frac{0.7}{R'}\right), \quad (2)$$

where $T_{55}$ is in nanoseconds; $R'$ is the resistance of resistor 59 in kohms; and $C'$ is the capacitance of capacitor 58 in picofarads. In the correction circuit that was built and tested, the $RC$ time constant of circuit 55 was selected to be 59 milliseconds long. The one-shot multivibrator 55 produces a positive going pulse signal on line 60 for a 59 millisecond time interval only in response to a positive going transition on line 33. Multivibrator 55 may, by way of example, be a TI 74123 IC package.

The Q output terminal of multivibrator 55 is connected to the other input terminal of NOR-gate 65 which may, by way of example, be a TI 7402 IC package. The output signal of gate circuit 65 on line 67 is the corrected dial pulse signal. This signal on line 67 is low when either or both of the input signals to gate 65 are high.

The integrated circuit packages comprising the circuits 20, 25, 35, 45, 55, and 65 and the operation thereof are described in more detail in The TTL Data Book for Design Engineers, First Edition, Texas Instruments Incorporated, Copyright 1973.

In accordance with this invention, corrected dial pulse signals with at least minimum break pulse intervals are produced in response to received dial pulses having break and make pulse intervals that are at least a prescribed duration for a range of PRF's. In one application, the correction circuit satisfactorily operates on receive dial pulses with PRF's of 10 ± 2.5 pps, i.e., PRF's from 7.5 to 12.5 pps, and minimum break and make pulse intervals of 17 milliseconds. This corresponds to minimum break and make pulse intervals of 22% of the dial pulse period (the break pulse interval plus the make pulse interval) for dial pulses with a maximum PRF of 13 pps. The corresponding dial pulse period is approximately 77 milliseconds long. A 22% minimum break pulse interval of approximately 17 milliseconds for this PRF of 13 pps has a corresponding make pulse interval of approximately 60 milliseconds. The correction circuit is therefore designed to produce a corrected dial pulse at 13 pps with a minimum break pulse interval of 59 millisecond duration in response to received dial pulses having break pulse intervals of greater than 17 milliseconds. The corresponding minimum make pulse interval of the corrected dial pulse, for a received dial pulse with a break pulse interval of less than 59 milliseconds duration, is 17 milliseconds. The break pulse interval of corrected dial pulses will be greater than 59 milliseconds long for received dial pulses having PRF's of less than 13 pps, but greater than 7.5 pps.

Figure 2:
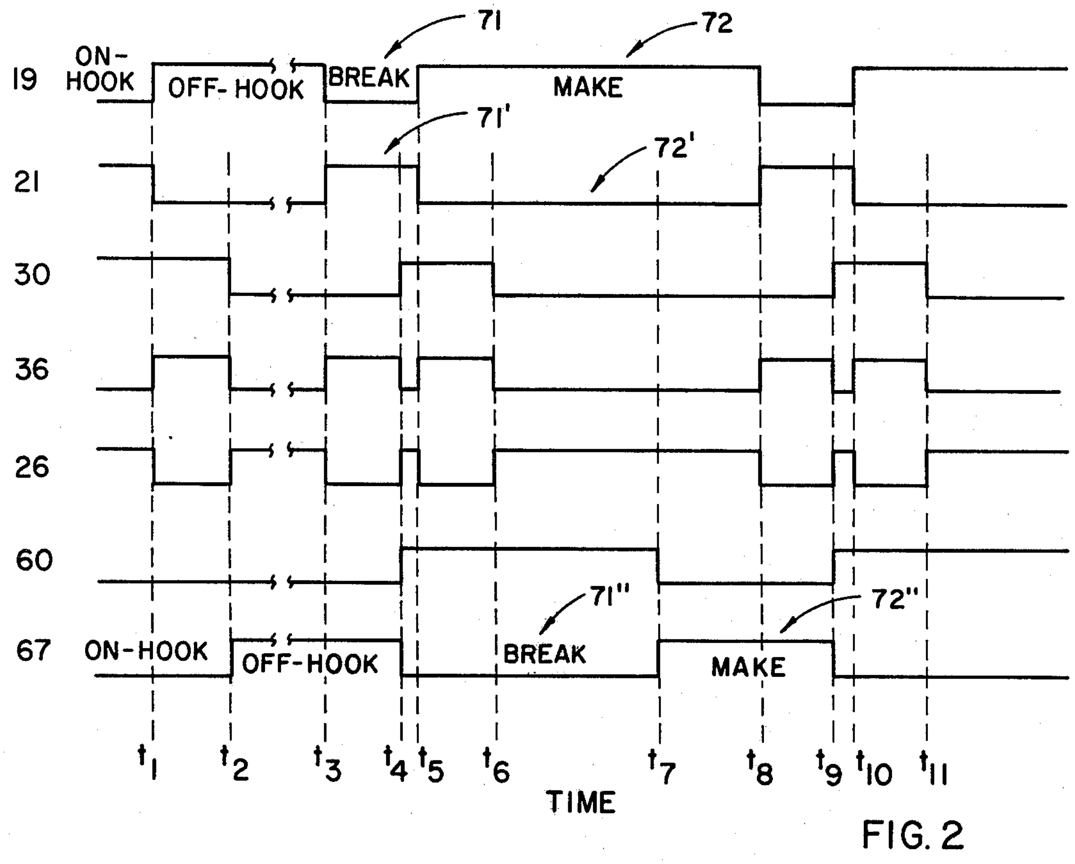
FIGS. 2 and 3 are groups of waveforms occurring at various points in the circuit of FIG. 1, and which are useful in explaining and illustrating the operation of this invention.

The operation of the circuits in FIG. 1 is illustrated by the waveforms in FIG. 2 which are designated by the same reference numerals as the lines in FIG. 1 on which they occur. The distorted input dial pulse signal 19 has a PRF of 10 pps (a 100-millisecond period), and a break pulse 71 and a make pulse 72 with break and make pulse intervals of 22 and 78 milliseconds, respectively. The input pulse 19 is inverted by circuit 20 to produce the inverted dial pulse signal 21 that has associated break and make pulses 71' and 72'. An associated subscriber handset (not shown) is on-hook prior to time $t_1$ and is off-hook between times $t_1$ and $t_3$. Prior to time $t_1$, the high (logic level 1) signals 21 and 30 disable the EXCLUSIVE-OR gate 35 and the circuits remain in the quiescent states as shown in FIG. 2. The high Q output 30 of flip-flop 25 holds NOR-gate 65 on prior to time $t_2$ to produce a long-term, low-level DC signal 67 that is an indication of the on-hook condition of the handset.

When the handset goes off-hook at time $t_1$, the low-level signal 21 enables the EXCLUSIVE-OR gate 35 to produce the signal 36 which turns on multivibrator 45 (waveform 26) for 17 milliseconds. When the multivibrator 45 output signal 26 times out at time $t_2$, flip-flop 25 (waveform 30) is enabled and stores the low-level signal at 21. Although the low-level signal 30 at time $t_2$ maintains multivibrator 55 (waveform 60) disabled, it enables NOR-gate 65 which produces a long-term, high-level DC signal 67 that is an indication of the off-hook condition of the handset. Since both of the input signals 21 and 30 to the EXCLUSIVE-OR gate 35 are now low, gate 35 (waveform 36) and multivibrator 45 (waveform 26) are both disabled.

When the dial contacts of the handset open at time $t_3$ to produce break pulse 71, the inverted signal 21 again goes high to enable the EXCLUSIVE-OR gate 35 (waveform 36) and thus multivibrator 45 (waveform 26) for 17 milliseconds, i.e., through time $t_4$. When the multivibrator 45 times out at time $t_4$, flip-flop 25 samples the high signal level on line 21. The high Q signal level 30 at time $t_4$ enables multivibrator 55 (waveform 60) which is turned on for 59 milliseconds until time $t_7$, regardless of the logic level of the inverted dial pulse 21 during the time interval $t_4$–$t_7$. Since both of the inputs 30 and 60 to NOR-gate 65 are now high, this circuit is enabled to initiate generation of a corrected break pulse 71'' on line 67. When the break pulse 71' in waveform 21 is terminated at time $t_5$, the EXCLUSIVE-OR gate 35 (waveform 36) and the multivibrator 45 (waveform 26) are again enabled. When the multivibrator 45 (waveform 26) times out at time $t_6$, the Q output 30 of flip-flop 25 goes low. Since the output 60 of multivibrator 55 is still high, however, NOR-gate 65 is maintained enabled until the 59 millisecond multivibrator 55 times out at time $t_7$. In this manner, a corrected break pulse 71'' of 59 milliseconds duration is produced in waveform 67 between times $t_4$ and $t_7$ in response to a distorted input break pulse 71 in waveform 19. This cycle of operation is repeated at time $t_8$ and produces a corrected make pulse interval 72'' in waveform 67 between times $t_7$ and $t_9$ of 41 milliseconds duration.

Analysis of the waveforms in FIG. 2 between times $t_3$ and $t_4$ reveals that a corrected break pulse 71'' is not produced in waveform 67 for an inverted break pulse 71' (not shown) in waveform 21 having a duration of less than 17 milliseconds. This operation is ensured since such a break pulse 71' in waveform 21 will be low prior to timing out of the 17 millisecond multivibrator 45 (waveform 26) at time $t_4$. The output 30 of the flip-flop 25 would therefore remain low to hold multivibrator 55 (waveform 60) disabled. Since both of the inputs 30 and 60 to gate 65 would then be low at time $t_4$, the NOR-gate output signal 67 remains high.

Figure 3:
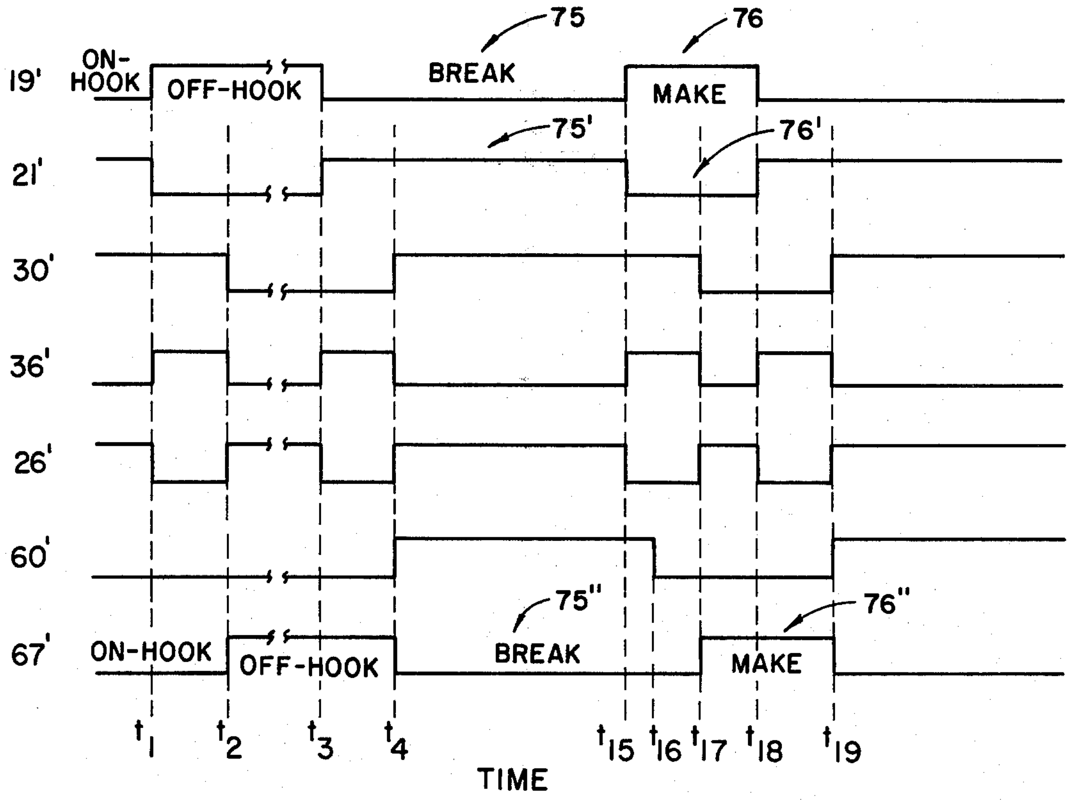

The waveforms in FIG. 3 illustrate the operation of the circuits in FIG. 1 in response to a distorted input dial pulse 19' which has a pulse repetition frequency of 10 pps (a 100 millisecond period), and a break pulse 75 and make pulse 76 with break and make pulse intervals of 70 milliseconds and 30 milliseconds, respectively. The corresponding waveforms in FIGS. 2 and 3 are the same up to the time $t_4$ when the 17 millisecond one-shot multivibrator 45 (waveform 26') times out. Because of the extended duration of the break pulse 75' in waveform 21', however, the Q output of 30' flip-flop 25 remains high after the 59 millisecond one-shot multivibrator 55 (waveform 60') times out at time $t_{16}$. Since at least one of the input signals 30' and 60' to NOR-gate 65 is still high, the output 67' thereof remains low. The Q output 30' of flip-flop 25 remains high until the $\overline{Q}$ output 26' of the 17 millisecond multivibrator 45 times out at time $t_{17}$ after going through its cycle of operation in response to termination of the break pulse 75' in waveform 21' at time $t_{15}$. Since both of the inputs 30' and 60' to NOR-gate 65 are now low at time $t_{17}$, the NOR-gate 65 is disabled and the output 67' thereof goes high at this time $t_{17}$ to terminate the corrected break pulse 75''. The durations of the corrected break pulse 75'' and make pulse 76'' in waveform 67' are 70 milliseconds and 30 milliseconds, respectively.

What is claimed is:

1. A dial pulse correction circuit responsive to received-input dial pulse signals with break and make pulse intervals which are each greater than a first prescribed minimum time interval for producing corrected dial pulse signals with break pulse intervals of at least a second prescribed minimum time interval, comprising:

first-control means responsive to transitions of a binary dial pulse input signal for changing the binary logic level of the output thereof;

second-timing means normally operating for producing an output of one logic level and being triggered in response to at least certain changes in the output logic level of said first means that are of one polarity to produce an output of another logic level for only a period of time that is equal to the first time interval;

third-sample storage means responsive to the change in the output of said second means from the another to the one logic level in going back to its normal operating state for sampling and storing the logic level of the input signal, the logic level stored by said third means being changed only when the logic level of the input signal is the same value at the beginning and at the end of a first time interval over which the output of said second means is the another logic level;

fourth-timing means normally operating for producing an output of one logic level and being responsive to a change of one polarity of the logic level stored by said third-storage means for producing an output of another logic level for a period of time that is equal to the second prescribed time interval; and, fifth-control means being responsive to a signal stored by said third means of only one of the binary logic levels for operating to cause the output thereof to be of one logic level, and also being responsive to the another logic level output signal from said fourth-timing means for operating to cause the output thereof to be of the same one logic level; the corrected dial pulse signal being the output signal of said fifth means which is of the one logic level for at least a period of time that is equal to the second time interval.

2. A dial pulse correction circuit responsive to received-input dial pulse signals with break and make pulse intervals which are each greater than a first prescribed minimum time interval for producing corrected dial pulse signals with break pulse intervals of at least a second prescribed minimum time interval, comprising:

first-control means responsive to transitions of a binary dial pulse input signal for changing the binary logic level of the output thereof;

second-timing means comprising a first monostable multivibrator normally operating in a stable state for producing an output of one logic level and being triggered during operation in the stable state by at least certain changes in the output logic level of said first means that are of one polarity for operation in a triggered state to produce an output of another logic level for only a period of time that is equal to the first time interval, and is unresponsive during operation thereof in the triggered state to such changes in the output logic level of said first means;

third-sample storage means responsive to the change in the output of said second means from the another to the one logic level in going back to its normal operating state for sampling and storing the logic level of the input signal, the logic level stored by said third means being changed only when the logic level of the input signal is the same value at the beginning and at the end of a first time interval over which the output of said second means is the another logic level;

fourth-timing means normally operating for producing an output of one logic level and being responsive to a change of one polarity of the logic level stored by said third-storage means for producing an output of another logic level for a period of time that is equal to the second prescribed time interval; and, fifth-control means being responsive to a signal stored by said third means of only one of the binary logic levels for operating to cause the output thereof to be of one logic level, and also being responsive to the another logic level output signal from said fourth-timing means for operating to cause the output thereof to be of the same one logic level; the corrected dial pulse signal being the output signal of said fifth means which is of the one logic level for at least a period of time that is equal to the second prescribed time interval.

3. The correction circuit according to claim 2 wherein said fourth-timing means comprises a second monostable multivibrator circuit that is responsive during operation thereof in a stable state to changes in the logic level stored by said third means that are of the one polarity for operating in a triggered state for a time period that is equal to the second time interval, and is unresponsive during operation thereof in the triggered state to such changes in the logic level stored by said third means.

4. The correction circuit according to claim 3 wherein said first-control means is responsive to logic levels stored by said third-storage means and to input dial pulses for changing the binary logic level output thereof on each transition of a binary dial pulse input signal.

5. The correction circuit according to claim 4 wherein said third means comprises a bistable multivibrator circuit which is clocked only on termination of operation of said first monostable multivibrator circuit in the triggered state for being responsive to the input dial pulse signal so that the latter signal controls the stable state of said bistable circuit.

6. The correction circuit according to claim 5 wherein said first-control means comprises an EXCLUSIVE-OR gate circuit.

7. The correction circuit according to claim 6 wherein said fifth means comprises a NOR-gate logic circuit.

8. The correction circuit according to claim 7 wherein said monostable multivibrator circuits have clear terminals and said bistable multivibrator circuit has clear and preset terminals; and including sixth means connecting high logic level one's to said clear and preset terminals.

9. A dial pulse correction circuit responsive to received-input dial pulse signals with break and make pulse intervals which are each greater than a first prescribed minimum time interval for producing corrected dial pulse signals with break pulse intervals of at least a second prescribed minimum time interval, comprising:

first-control means responsive to binary dial pulse input signals and operative for changing the binary logic level of the output thereof for each transition of the input dial pulse;

second-timing means normally operating in a stable logic state and being responsive during operation thereof in the stable state to changes in the output logic level of said first means that are of only one polarity for operating in a triggered state for only a time period that is equal to the first time interval;

third-sample storage means responsive to termination of operation of said second means in the triggered state for sampling and storing the logic level of the input signal, the logic level stored by said third means being changed only when the logic level of the input signal is the same value at the beginning and at the end of a first time interval over which said second means operates in the triggered state;

fourth-timing means normally operating in a stable logic state and being responsive during operation thereof in the stable state to a change of one polarity of the logic level of the signal stored by said third means for operating in a triggered-monostable state for only a time period that is equal to the second prescribed time interval; and, fifth-control means being responsive to a signal stored by said third means and of only one of the two binary logic levels for operating to cause the output thereof to be of one logic level, and also being responsive to operation of said fourth timing means in the triggered state for operating to cause the output thereof to be of the same one logic level; the corrected dial pulse signal being the output signal of said fifth means which is of the one logic level for at least a period of time that is equal to the second prescribed time interval.

* * * * *